(12) United States Patent
Chalyan et al.

(10) Patent No.: US 7,345,272 B2
(45) Date of Patent: Mar. 18, 2008

(54) OPTICAL DECODER SYSTEMS AND CORRESPONDING METHODS

(75) Inventors: Anatoliy Chalyan, Santa Ana, CA (US); David Hawrylo, Tujunga, CA (US); Matt Lingua, Burbank, CA (US); Ray Feigenbaum, Simi Valley, CA (US)

(73) Assignee: Mason Electric Co., San Fernando, CA (US)

( * ) Notice: Subject to any disclaimer, the term of this patent is extended or adjusted under 35 U.S.C. 154(b) by 0 days.

(21) Appl. No.: 11/709,345

(22) Filed: Feb. 20, 2007

(65) Prior Publication Data

US 2007/0272835 A1    Nov. 29, 2007

Related U.S. Application Data

(63) Continuation of application No. 10/844,059, filed on May 12, 2004, now Pat. No. 7,199,353.

(51) Int. Cl.
*G09G 5/00* (2006.01)

(52) U.S. Cl. .................. 250/221; 250/231.13; 345/161; 345/165; 200/61.54

(58) Field of Classification Search ................ 250/221, 250/231.13, 231.14; 345/161, 165, 166, 345/184; 200/61.02, 61.39, 61.54
See application file for complete search history.

(56) References Cited

U.S. PATENT DOCUMENTS

| | | | |
|---|---|---|---|
| 3,435,167 A | 3/1969 | Pfleger | |
| 3,654,413 A | 4/1972 | Jordan et al. | |
| 4,939,508 A | 7/1990 | Lawrence et al. | |
| 4,952,919 A * | 8/1990 | Nippoldt | 345/167 |
| 5,248,961 A | 9/1993 | Fujii et al. | |
| 5,404,085 A | 4/1995 | Resch et al. | |
| 5,410,332 A | 4/1995 | Barry et al. | |
| 5,473,344 A | 12/1995 | Bacon et al. | |
| 5,486,845 A | 1/1996 | Chait | |
| 5,734,374 A | 3/1998 | Chambers | |
| 5,739,813 A | 4/1998 | Imai et al. | |
| 5,780,795 A | 7/1998 | O'Reilly | |
| 5,926,167 A | 7/1999 | Niitsuma et al. | |
| 5,963,197 A | 10/1999 | Bacon et al. | |
| 5,973,674 A | 10/1999 | Buecker | |
| 6,084,574 A | 7/2000 | Bidiville et al. | |
| 6,218,659 B1 | 4/2001 | Bidiville et al. | |
| 6,225,980 B1 | 5/2001 | Weiss et al. | |
| 6,307,465 B1 | 10/2001 | Kayama et al. | |
| 6,344,643 B1 | 2/2002 | Chen | |
| 6,379,250 B2 | 4/2002 | Adamczyk et al. | |
| 6,429,848 B2 | 8/2002 | Merminod et al. | |
| 6,509,890 B1 | 1/2003 | May | |

(Continued)

*Primary Examiner*—Kevin Pyo
(74) *Attorney, Agent, or Firm*—Perkins Coie LLP

(57) ABSTRACT

The present invention is generally directed toward optical encoder systems and corresponding methods. One aspect of the invention is directed toward an optical encoder system that includes an optical encoder device having an input wheel. The optical encoder device further includes at least one light emitter and at least one light sensor to detect rotational movement of the input wheel. In a further aspect, the optical encoder device is coupled to a vehicle. In a still further aspect, the optical encoder device can be coupled to a control inceptor in a vehicle. In yet a further aspect, optical encoder device can include a housing so that the optical encoder device is couplable to structure as a single modular unit.

20 Claims, 6 Drawing Sheets

U.S. PATENT DOCUMENTS

| | | |
|---|---|---|
| 6,686,903 B1 | 2/2004 | Peng et al. |
| 6,731,268 B2 | 5/2004 | Anton et al. |
| 6,798,397 B2 | 9/2004 | O'Keeffe et al. |
| 6,825,831 B1 | 11/2004 | Passaro |
| 6,906,700 B1 | 6/2005 | Armstrong |
| 2001/0020932 A1* | 9/2001 | Merminod et al. ......... 345/156 |
| 2001/0050673 A1 | 12/2001 | Davenport |
| 2002/0000971 A1 | 1/2002 | Armstrong |
| 2002/0050978 A1 | 5/2002 | Rosenberg et al. |
| 2002/0084986 A1 | 7/2002 | Armstrong |
| 2002/0145108 A1 | 10/2002 | Rodi |
| 2003/0025673 A1* | 2/2003 | Ledbetter et al. ........... 345/163 |
| 2003/0076303 A1 | 4/2003 | Huppi |
| 2003/0142071 A1* | 7/2003 | Yu .............................. 345/157 |
| 2003/0160763 A1 | 8/2003 | Cheng et al. |
| 2004/0036677 A1 | 2/2004 | Ono et al. |
| 2004/0041787 A1 | 3/2004 | Graves |
| 2004/0046741 A1 | 3/2004 | Low et al. |
| 2004/0095324 A1 | 5/2004 | Bricaud et al. |
| 2004/0160414 A1 | 8/2004 | Armstrong |
| 2004/0257339 A1 | 12/2004 | Takahashi |
| 2005/0030279 A1 | 2/2005 | Fu |
| 2005/0052425 A1 | 3/2005 | Zadesky et al. |
| 2005/0083318 A1 | 4/2005 | Rix et al. |
| 2005/0088413 A1 | 4/2005 | Brewer et al. |
| 2005/0093821 A1 | 5/2005 | Massie et al. |
| 2005/0156881 A1 | 7/2005 | Trent et al. |
| 2005/0156890 A1 | 7/2005 | Wierzoch |
| 2005/0168438 A1* | 8/2005 | Casebolt et al. ............ 345/156 |
| 2005/0168488 A1 | 8/2005 | Montague |
| 2005/0174331 A1 | 8/2005 | Vayda |
| 2005/0231476 A1 | 10/2005 | Armstrong |
| 2005/0264533 A1 | 12/2005 | Ledbetter et al. |
| 2005/0275637 A1 | 12/2005 | Hinckley et al. |

* cited by examiner

OPTICAL DECODER SYSTEMS AND CORRESPONDING METHODS

CROSS-REFERENCE TO RELATED APPLICATIONS

This application is a continuation of U.S. patent application Ser. No. 10/844,059 filed May 12, 2004, now U.S. Pat. No. 7,199,353 entitled "OPTICAL DECODER SYSTEMS AND CORRESPONDING METHODS" which is fully incorporated herein by reference in its entirety.

TECHNICAL FIELD

The following disclosure relates generally to optical encoder systems and corresponding methods, for example, optical encoder devices having input wheels that provide manual data entry functions.

BACKGROUND

As aircraft systems become increasingly complex, there is an ever-increasing need to provide simple and efficient ways for operators to interface with these vehicles. In designing modern aircraft cockpits, aircraft designers and human factors engineers must consider the environment and flight envelope in which the aircraft will operate, pilot workload, and the maintainability of the aircraft. For example, most modern fighter aircraft are designed so that the pilot can operate many of the major systems on the aircraft (e.g., flight control surfaces, thrust control, radar, and fire control system) while maintaining the pilot's hands on the throttle and control stick (HOTAS). Additionally, more and more systems on modern aircraft are becoming computer mediated, changing the way in which the pilot interfaces with various systems. For example, many onboard and data link systems require the pilot to scroll through and select items off series of lists.

Although conventional optical encoders having scroll and select functions are well known and widely used to interface with personal office computer, the conventional optical encoders are not suitable for the harsh operating conditions that modern day aircraft experience. For example, the conventional optical encoders lack the required reliability; resistance to vibration, shock, and normal acceleration; resistance to sand, dust, and liquid; resistance to high intensity radiated fields, and resistance to electromagnetic interference with or from other systems. Furthermore, these devices lack the tactile feedback, small size, and structural framework for installation into an aircraft throttle or stick for mission segments where HOTAS operation is desirable.

SUMMARY

The present invention is generally directed toward optical encoder systems and corresponding methods, for example, optical encoder devices having input wheels that provide manual data entry functions. One aspect of the invention is directed toward an optical encoder device coupled to a vehicle. The optical encoder device includes an input wheel positioned to be actuated by an operator. The optical encoder device further includes at least one light emitter and at least one light sensor. The light emitter and the light sensor are located proximate to the input wheel to detect rotational movement of the input wheel.

In other aspects of the invention, the vehicle can include a control inceptor and the optical encoder device can be coupled to the control inceptor. The optical encoder device can further include a ratchet mechanism operatively coupled to the input wheel to provide the input wheel with at least one detented rotational position. In yet another aspect of the invention, the optical encoder device can further include a switch located proximate to the input wheel and the input wheel can be operatively coupled to the switch so that a selected radial force on the input wheel activates the switch.

Further aspects of the invention are directed toward an optical encoder system that includes an optical encoder device having an input wheel, at least one light emitter, and at least one light sensor. The light emitter and the light sensor are located proximate to the input wheel to detect rotational movement of the input wheel. The optical encoder device further includes a housing surrounding the input wheel, the light emitter, and the light sensor so that the optical encoder device is couplable to structure as a single modular unit. In another aspect, the housing is further configured to surround the input wheel, the light emitter, and the light sensor to resist at least one of electromagnetic interference between the optical encoder device and an external electromagnetic source, foreign material from entering the optical encoder device, and the effects of a high intensity radiated field on the optical encoder device.

DETAILED DESCRIPTION

The present invention describes optical encoder systems and corresponding methods. Several specific embodiments are set forth in the following description and in FIGS. 1-8 to provide a thorough understanding of certain embodiments of the invention. One skilled in the art, however, will understand that the present invention may be practiced without several of the specific features explained in the following description.

Figure 1:
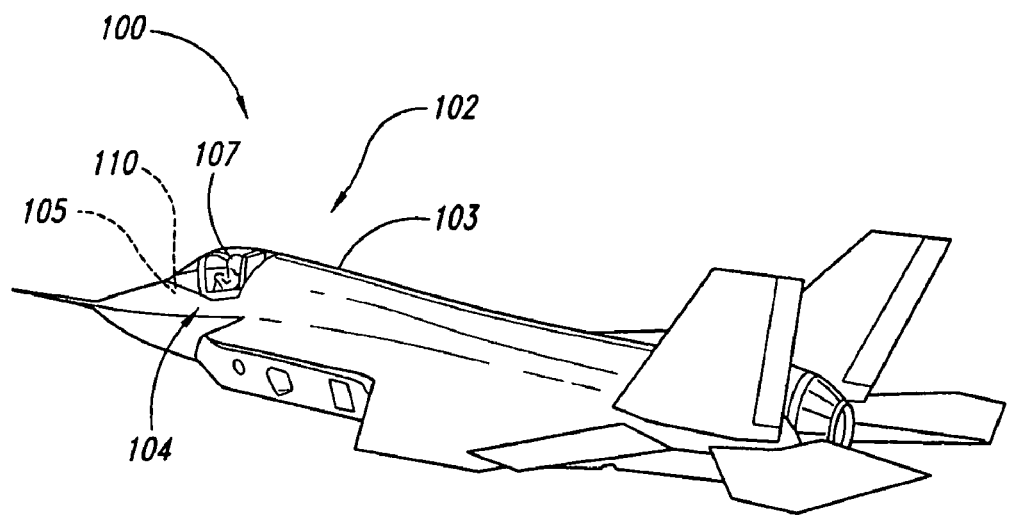
FIG. 1 is an isometric view of a vehicle having an optical encoder system in accordance with an embodiment of the invention.

FIG. 1 is an isometric view of an optical encoder system 100 that includes a vehicle 102 and an optical encoder device 110 in accordance with an embodiment of the invention. The vehicle 102, shown in FIG. 1, is an aircraft having a fuselage 103 with a cockpit 104 where the operator 107 is located. The cockpit 104 includes several control inceptors 105 (e.g., control stick, thrust control, and other switches) that the operator 107 uses to interface with the vehicle 102.

Figures 2A, 2B, 2C:
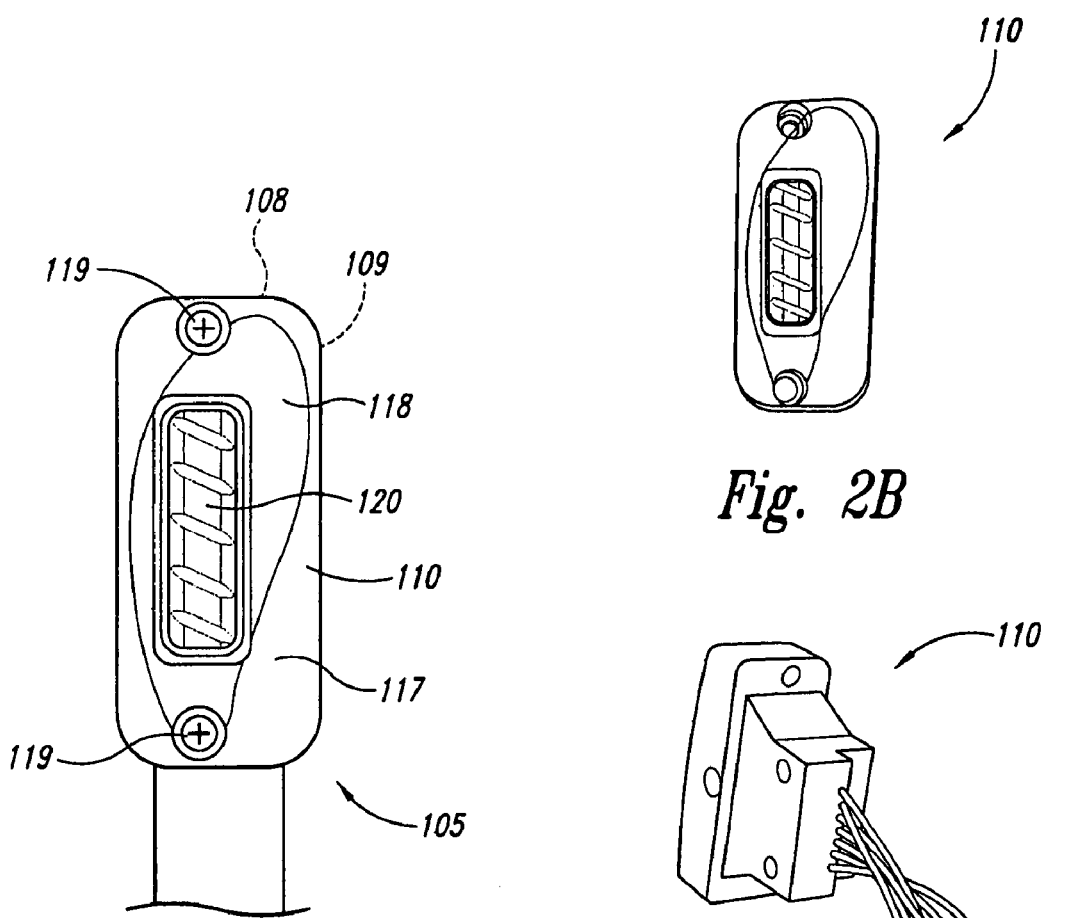
FIG. 2A is an elevational view of an optical encoder device coupled to a control inceptor of the vehicle shown in FIG. 1.
FIG. 2B is a front isometric view of the optical encoder device shown in FIG. 2A.
FIG. 2C is a rear isometric view of the optical encoder device shown in FIG. 2A.

FIG. 2A is an enlarged front elevational view of a control inceptor 105 of the vehicle 102 (FIG. 1), with a modular optical encoder device 110 coupled to the control inceptor 105. FIGS. 2B and 2C are isometric front and rear views respectively of the encoder device 110 of FIG. 2A shown removed from the control inceptor 105. The control inceptor 105 (FIG. 2A), is a thrust control lever having a recess that receives a portion of the optical encoder device 110 and receptacles for receiving attaching elements 119 (e.g., bolts, screws, or clips) to secure the optical encoder device in position. The thrust control lever is positioned in the cockpit to receive the operator's left palm on the top 108 and/or side 109 so that at least one of the operator's fingers naturally falls across the finger groove 118 of the face plate 117 of the optical decoder 110. A portion of an input wheel 120 is exposed in the finger groove 118 and positioned to be actuated (e.g., rolled up or down and/or depressed with a radial force toward the thrust lever) by a single finger of the operator.

The optical encoder device 110 can be configured to optically detect movement of the input wheel 120 and send signals (e.g., digital signals) to other systems in the vehicle (e.g., a computer). For example, the input wheel 120 of the optical encoder device 110 can allow the operator to scroll through lists or menus and/or to perform other functions such as controlling an elevation (angle above or below the horizon) of a radar transmission beam. In certain embodiments, the operator can apply a radial force to the input wheel 120 to command additional functions (e.g., selecting an item from a list that has been scrolled through using the input wheel 120).

In other embodiments the optical encoder device 110 can be installed in other types of vehicles, including ground based vehicles (e.g., an armored vehicles) or a water vessels (e.g., a ships or boats). In still other embodiments, the optical encoder device can be coupled to other locations in or on the vehicle (e.g., other control inceptors or panels) and/or coupled to the vehicle via other methods (e.g., using more or fewer attaching elements 119, or being built integrally into a vehicle component). In yet other embodiments, the optical encoder device 110 can be positioned to be actuated in different directions (e.g., horizontally instead of vertically) or by different parts of the hand or body (e.g., actuated by an operator's foot). In still other embodiments, the optical encoder system can be used in non-vehicular applications.

Figure 3A:
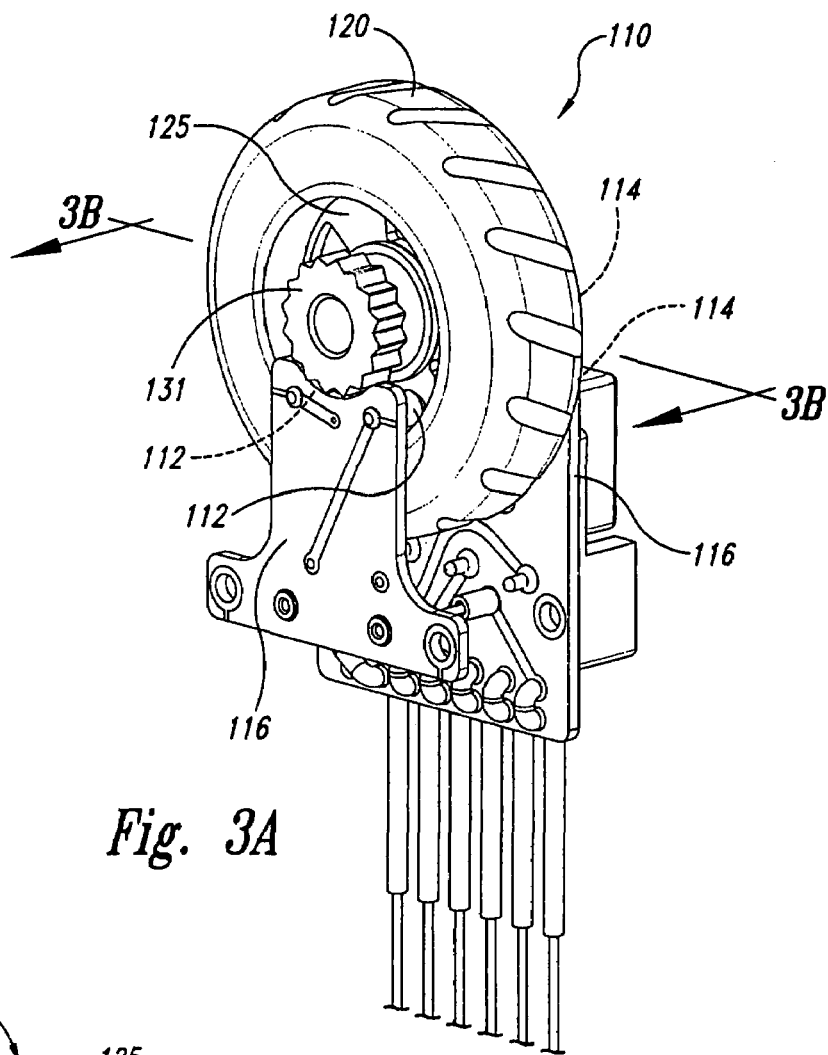
FIG. 3A is an enlarged isometric view of a portion of the optical encoder device shown in FIG. 2A that includes the input wheel, at least one light emitter, and at least one light sensor.
Figure 3B:
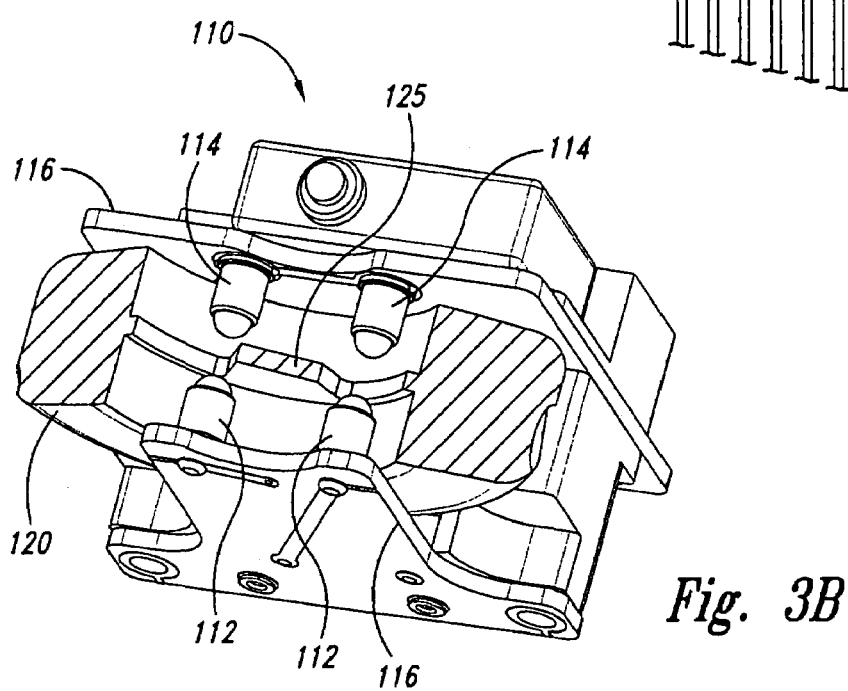
FIG. 3B is a cross-sectional top view of the portion of the optical encoder device shown in FIG. 3A taken along line 3B-3B.

FIG. 3A is a partially schematic isometric view and FIG. 3B is a partially schematic isometric cross-sectional top view (taken at line 3B-3B in FIG. 3A) of a portion of the optical encoder device 110, shown in FIG. 2A, having an input wheel 120, at least one light emitter 112, and at least one light sensor 114. For reference, the portion of the input wheel 120 at the top of FIG. 3A is the exposed portion of the input wheel 120 shown in FIG. 2A. In FIGS. 3A and 3B, the input wheel 120 includes a coded portion 125 having a series of spokes. The two light emitters 112 transmit light toward the input wheel 120 and toward two corresponding light sensors 114. As the input wheel 120 rotates, the spokes alternately block and open the optical path between the light emitters 112 and the light sensors 114. Movement of the input wheel 120 can be detected by monitoring the pattern of light received by the light sensors. The direction of the rotation can be determined by the sequence in which the light sensors 114 receive light (or alternately do not receive light) and the rate of rotation can be determined by the frequency that the light sensors receive light (or alternately do not receive light).

In certain embodiments, the light emitters 112 and the light sensors 114 can be mounted on circuit boards 116, as shown in FIGS. 3A and 3B. The circuit boards 116 can generate formatted signals for transmissions to other devices, provide computational functions, and/or provide other circuitry required by the optical encoder device 110. In other embodiments, the optical encoder device can transmit the raw signal to other vehicle systems. In still other embodiments, the coded section 125 of the input wheel 120 can include other types of coding (e.g., opaque and translucent portions, coded markings, bar codes, or reflective segments) and the light emitters 112 and light sensors 114 can be positioned differently (e.g., positioned on the same side of the wheel when using reflective segments). In yet other embodiments, there can be more or fewer light emitters 112 and/or light sensors 114. In further embodiments, the input wheel 120 can be coupled to another element (e.g., an axle or a detent wheel 131, discussed in detail below) and the light emitters 112 and light sensors 114 can be configured to detect the movement of the other element. In still further embodiments, the light emitters 112 and light sensors 114 can also be configured to detect a position of the input wheel 120 (e.g., when using coded markings or bar codes).

Figure 4:
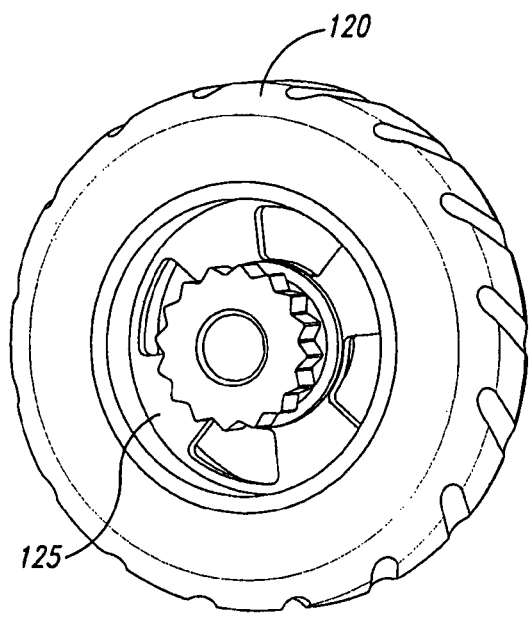
FIG. 4 is an enlarged isometric view of a portion of the optical encoder device shown in FIG. 2A that includes the input wheel.

FIG. 4 is a partially schematic isometric illustration of the input wheel 120 shown in FIG. 2A, having the coded section 125. In some embodiments, the input wheel 120 includes a metallic material (e.g., aluminum) and/or a plastic or rubber material. In other embodiments, the input wheel 120 can have other shapes. For example, in certain embodiments, the input wheel 120 can have a spherical shape. In some embodiments, the input wheel 120 can include grooves, as shown in FIG. 4, to provide a desired amount of friction to aid the operator in rotating the wheel. In still other embodiments, the input wheel 120 can have ridges or a smooth surface where the input wheel 120 is intended to be engaged by an operator.

One feature of foregoing embodiments, discussed above with reference to FIGS. 1-4 is that the optical encoder devices 110 are modular units that can be made to conform to small areas because the light emitters and sensors are small and can be mounted on circuit boards carrying circuitry necessary for the operation of the optical encoder device. An advantage of this feature is that optical encoder devices can be located in areas where there is little open space (e.g., on the throttle and stick of modern fighter aircraft where many other control devices are located). Additionally, because little space is required to install an optical encoder device, more locations within a vehicle can be available for placing the optical encoder devices.

Another feature is that optical encoder devices can be extremely reliable because there are few moving parts that may be subject to wear. Accordingly, they can have low maintenance requirements. An advantage of this feature is that there can be high vehicle availability and low maintenance cost with respect to the small modular optical encoder systems.

Figure 5:
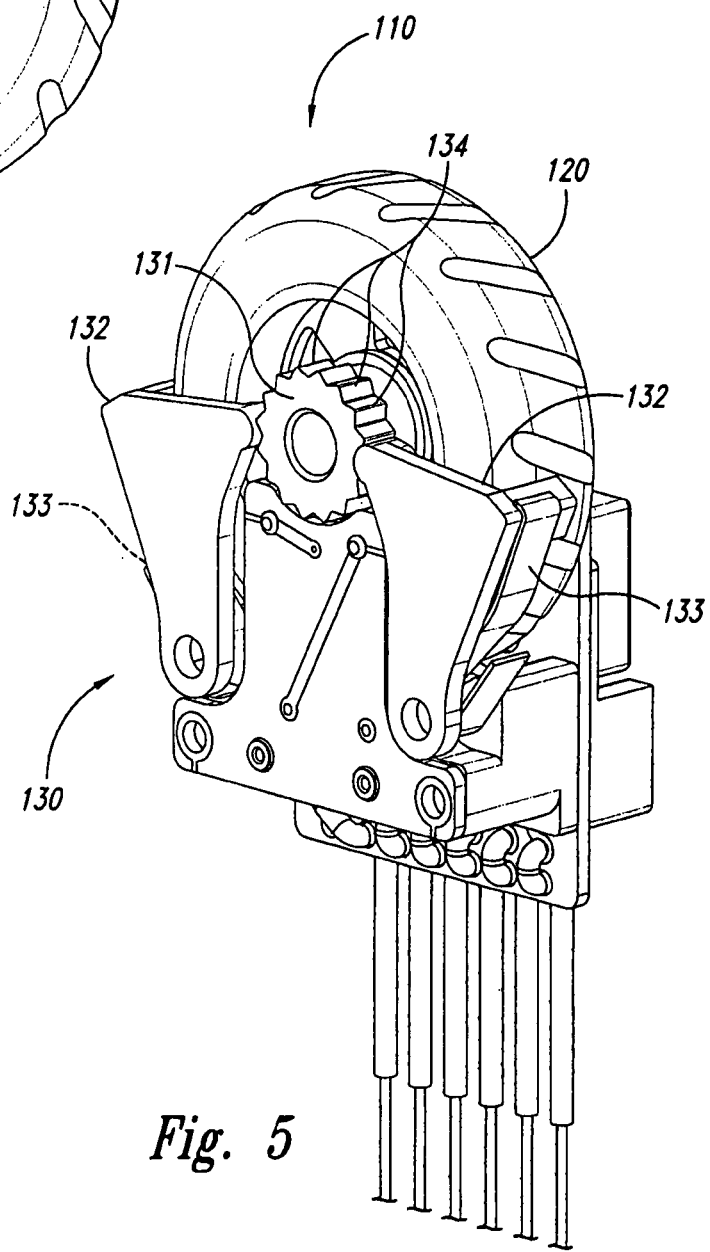
FIG. 5 is an enlarged isometric view of a portion of the optical encoder device shown in FIG. 2A that includes a ratchet mechanism coupled to the input wheel.

FIG. 5 is a partially schematic isometric view of the optical encoder device 110, shown in FIG. 2A, with the input wheel 120 and a ratchet mechanism 130 that holds the input wheel 120 in place until a selected rotational force threshold is exceeded. The ratchet mechanism 130 includes a detent wheel 131 coupled to the input wheel 120, two detent arms 132, and two detent springs 133. The two detent arms 132 are urged against the detent wheel 131 by their respective detent springs 133. The detent arms 132 engage detents 134 in the detent wheel 131, holding the detent wheel 131 in place. Correspondingly, the input wheel 120 is also held in place.

In order for the operator to rotate the input wheel 120, the operator must apply a rotational force to the input wheel 120 sufficient to cause the beveled edges of the detents 134 engaged by the detent arms 132 to push the detent arms 132 apart against the force being applied by the detent springs 133. As the input wheel 120 and the detent wheel 131 rotate, the detent arms 132 follow the contours of the detents 134 as long as sufficient rotational force is applied to the input wheel 120 to overcome the force applied by the detent springs 133. When the rotational force is removed, the detent arms 132 engage detents 134 and holding the detent wheel 131 and the input wheel 120 in place. Further details of aspects of the foregoing ratchet mechanism are disclosed in U.S. Pat. No. 3,654,413, which is incorporated herein in its entirety by reference.

Other embodiments can have more or fewer detents 134, detent springs 133, and/or detent arms 132. In still other embodiments, the ratchet device can have other configurations, for example, grooves or ridges in/on the input wheel 120 can be used to engage the detent arms 132. In yet other embodiments, a different type of ratchet device can be used. For example, a friction device that operates on (e.g., rubs against) the input wheel 120 can be used resist rotation of the input wheel 120.

A feature of forgoing embodiments discussed above with reference to FIG. 5 is that it can provide tactile feedback (e.g., force and incremental positions) to the operator, while maintaining the small size of the optical encoder device. An advantage of this feature is that tactile feedback can allow the operator to make inputs to the input wheel more precisely than when little or no tactile feedback is provided. Additionally, because the operator can make inputs more precisely, the overall workload associated with operation of the vehicle can be reduced for tasks involving the use of the optical encoder device.

Another feature is that the detent wheel and input wheel can remain stationary when exposed to certain levels of vibration, shock, and/or normal acceleration. Accordingly, stray and/or unintentional inputs to the optical encoder device can be avoided. An advantage of this feature is that it can reduce operator workload because the operator does not have to compensate for the unintentional inputs caused by vibration, shock, and/or normal acceleration.

Figure 6:
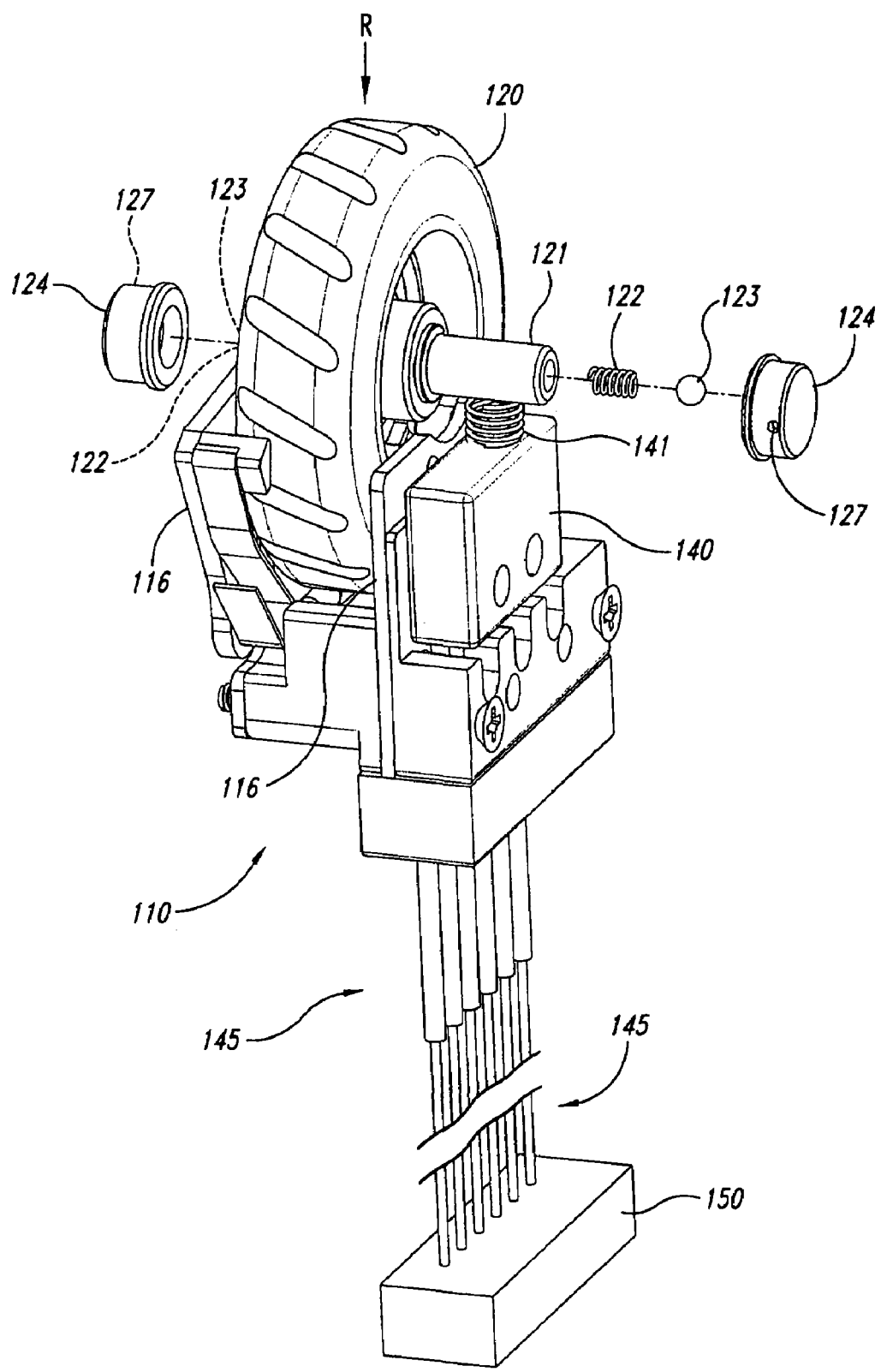
FIG. 6 is an enlarged, partially exploded, isometric view of a portion of the optical encoder device shown in FIG. 2A that includes a switch operatively coupled to the input wheel.
Figure 7:
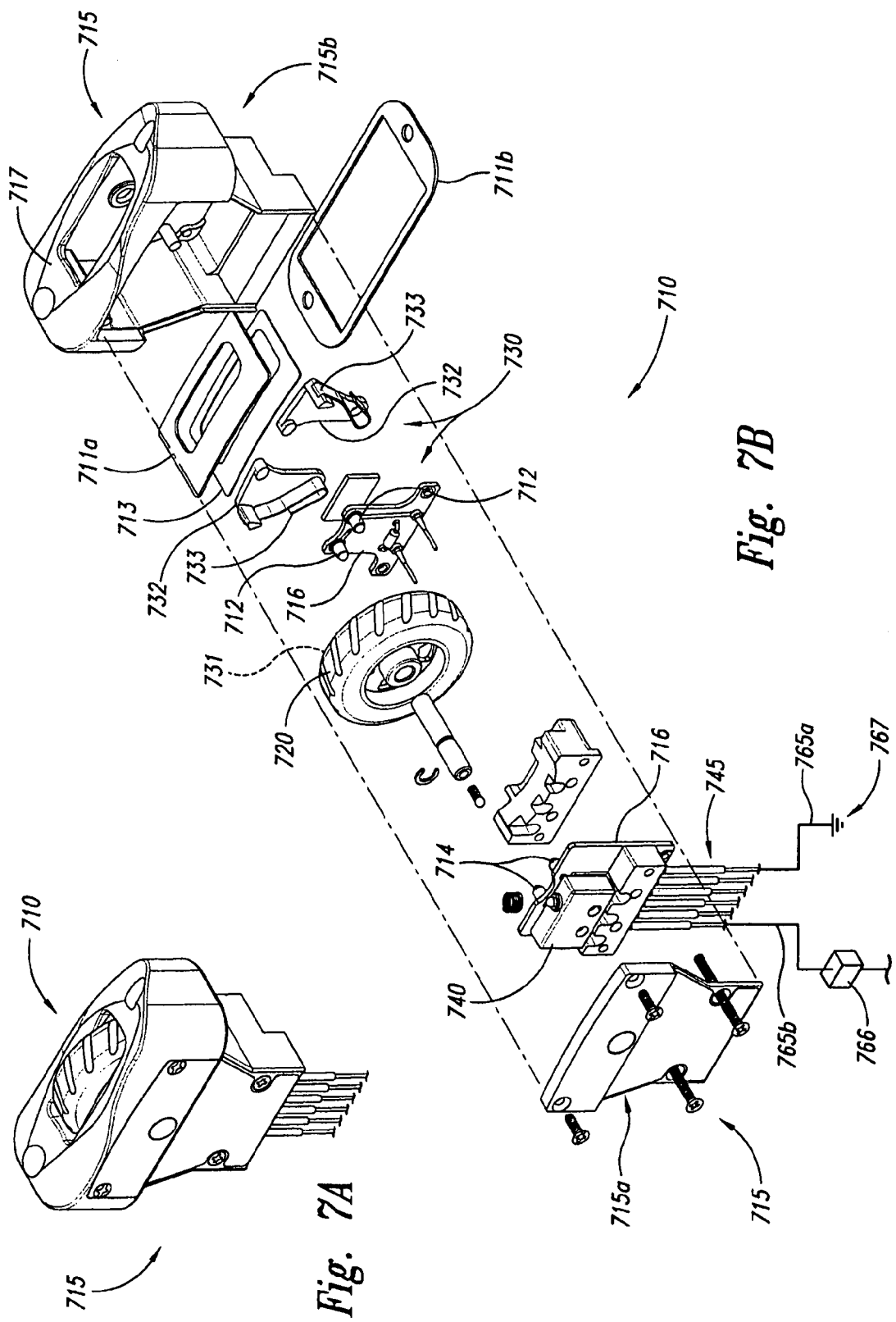
FIG. 7A is a isometric view of an optical encoder device having a housing in accordance with another embodiment of the invention.
FIG. 7B is an exploded isometric view of the optical encoder device shown in FIG. 7A.

FIG. 6 is a partially schematic isometric view of the optical encoder device 110 shown in FIG. 2A with the input wheel 120 operatively coupled to a switch 140 configured to provide the optical encoder device 110 with additional functionality. The input wheel rotates on an axle 121. Each end of the axle 121 has a recessed portion that receives an axle spring 122 and at least a portion of a ball 123. Each end of the axle 121 is received in a bushing 124 having an oblong opening for receiving an end of the axle 121. Each bushing 124 also includes a pin 127 forming an internal ridge or bump located between an upper and lower portion of the oblong opening.

A switch spring 141 is operatively coupled between the input wheel 120 and the switch 140 via the axle 121. The switch spring 141 urges the axle 121 into the upper portion of the oblong bushings 124. When a selected radial force, shown by arrow R, is exerted on the input wheel 120, the axle 121 moves down toward the switch 140 against the resistance of the switch spring 141. As the axle 121 moves, the balls 123 will transition from the upper portion of the bushings 124, over the bump formed by the pin 127, to the lower portions of the bushings 124. As the balls 123 transition over the bump formed by the pin 127, the balls 123 cause the axle springs 122 to compress, creating further resistance and tactile feedback to the operator. As the axle 121 continues to compress the switch spring 141 a portion of the radial force is transferred to the switch 140, actuating the switch 140. When the radial force is released, the switch spring 141 urges the axle back to the upper portions of the bushings 124, returning the input wheel 120 to its original position.

Other arrangements can be used to transfer the radial force applied to the input wheel. For example, in other embodiments, only one end of the axle 121 is configured to receive an axle spring 122 and at least a portion of a ball 123. Additionally, only the corresponding bushing 124 includes a pin 127. Accordingly, only the corresponding side of the axle 121 moves to actuate the switch 140.

When the switch 140 is actuated it can send a signal to the circuit boards 116 for processing or directly to other systems. For example, the signal can be used to trigger the selection of an item from a list that has been scrolled through using the input wheel 120 and the light emitters and sensors discussed above with reference to FIGS. 3A and 3B. In other embodiments, the switch 140 can have other functions (e.g., toggling between different lists). In certain embodiments, the output from the light sensors and/or the switch 140 can be transmitted via signal carriers 145 (carrying electrical or optical signals) or via wireless methods (e.g., infrared or radio waves). In certain other embodiments, the optical encoder device 110 and the switch 140 can be installed in vehicle carrying a computer 150 and the optical encoder device 110 and/or switch can be operatively coupled to the computer 150.

In still other embodiments, the switch can be configured to measure movement of the input wheel 120 in response to a radial force using other methods. For example, instead of the axle 121 being coupled to the switch 140, the input wheel 120 itself can contact the switch 140. In yet another embodiment, light sensors can be used to detect optically detect movement of the input wheel 120 in response to a radial force. In further embodiments, the switch 140 can be configured to measure a force exerted on the input wheel 120 (e.g., via the use of a strain gauge on the axle 121) instead of, or in addition to, the movement of the input wheel 120. In still further embodiments, the switch 140 can have multiple actuation points that provide a different signals based on the distance the input wheel 120 moves in response to a radial force and/or how much radial force is applied to the input wheel 120.

In certain embodiments, the force required to rotate the input wheel 120 and the radial force required to actuate the switch can be tailored to provide the desired tactile feedback. For example, the system can be designed to require approximately 4 inch-ounces of torque to rotate the input wheel 120 and approximately two pounds of radial force on the input wheel 120 to actuate the switch 140. Other embodiments can use other combinations of threshold torque and force values.

A feature of foregoing embodiments, discussed above with reference to FIG. 6, is that additional functionality can be provided to an optical encoder system while maintaining the small and compact size of the optical encoder device. For example, the optical encoder device can provide a scroll function via the rotation of the input wheel and a select function via the application of a radial force to the input wheel. An advantage to this feature can be a decrease in the number of separate controls required in a vehicle and/or a reduction of operator workload since the operator can accomplish multiple functions using one control device and without having to move his/her hands to another switch.

FIG. 7A is a partially schematic isometric view of an optical encoder device 710 having a housing 715 surrounding the elements of the optical encoder device 710 to provide a modular unit that can be easily removed and replaced in accordance with another embodiment of the invention. Additionally, as discussed below in greater detail, the housing can protect the optical encoder device 710 from the conditions associated with various operating environments. FIG. 7B is a partially schematic isometric expanded view of the optical encoder device shown in FIG. 7A and illustrates many of the forgoing features discussed above with reference to FIGS. 3-6.

In FIG. 7B, two housing sections are shown as a first housing section 715a and second housing section 715b, which includes an integral faceplate 717. Other embodiments can have more or fewer housing sections and/or other configurations (e.g., different shapes). The housing 715 can provide structural protection to the optical encoder device 710 and can also provide a barrier to seal out foreign material (e.g., dirt, dust, sand, or liquid). Additionally, the housing 710 can be configured (e.g., by use conductive materials) to resist electromagnetic interference (EMI), including radio frequency interference, between the optical encoder device 710 and other systems external to the optical encoder device 710 (e.g., computers, radars, and radios) and can resist the effects of high intensity radiated fields (HIRF), including lightening, on the optical encoder device 710.

The optical encoder device 710 can also include at least one of a gasket, seal, shield, cable and filter to provide further protection against the conditions associated with a harsh operating environment. For example, in FIG. 7B, the signal carriers 745 of the optical encoder device 710 include a cable 765a that is connected to ground 767 and a separate cable 765b connected to a filter 766 to provide additional protection against EMI and HIRF. Additionally, a seal 711a is used to seal the area where the input wheel 720 protrudes from the faceplate 717. The seal 711a is held in place by a clip 713, which also serves as a shield. The seal 711a and the clip 713 can form a structural barrier to resist foreign materials from entering the optical encoder device 710 and can also provide EMI and HIRF protection.

Figure 8:
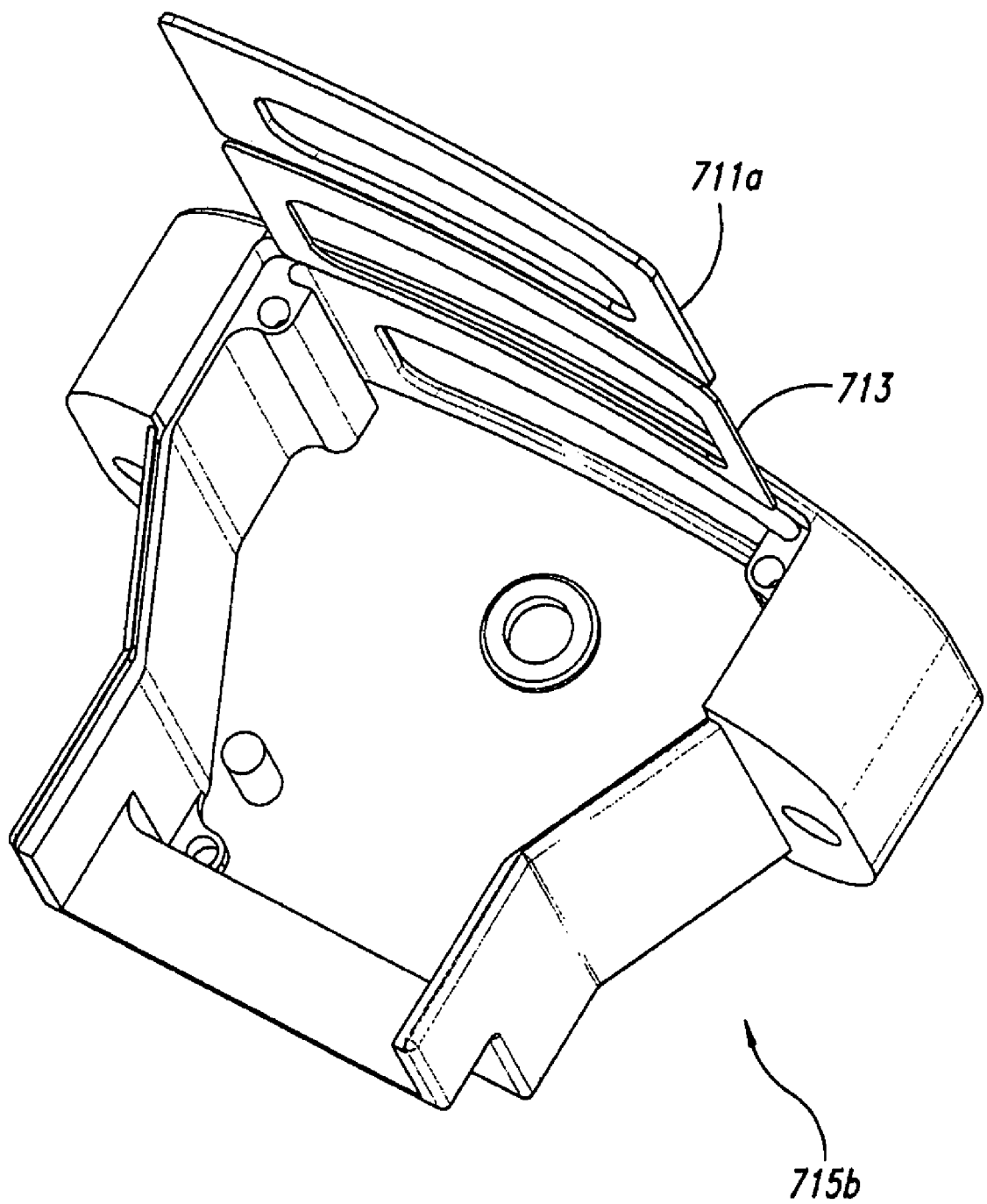
FIG. 8 is an enlarged isometric view of a portion of the housing of the optical encoder device shown in FIG. 7A.

For example, the clip 713 can be made from a conductive material (e.g., a metallic material) and be coupled to the housing to carry electrical charges around or away from the optical encoder device 710. The seal 711a can be made from a conductive silicon rubber that is both flexible, providing good structural sealing properties, and conductive, to carry electrical charges around or away from the optical encoder device 710. FIG. 8 provides an additional illustration of the seal 711a, the clip 713, and the second housing section 715b shown in FIG. 7A.

Returning to FIGS. 7A and 7B, the optical encoder device 710 can also use a similar seal or gasket on the exterior of the housing. For example, a seal 711b can be used to seal the junction of the optical encoder device 710 and a vehicle inceptor to protect the optical encoder device 710 and other components inside the inceptor from foreign materials, EMI, and/or HIRF. A suitable conductive silicon rubber is available from the Kirkhill-TA Company of Valencia, Calif.

Other embodiments can have other configurations. For example in certain embodiments, more or fewer seals, gaskets, shields, cables, and filters can be used in differing combinations. In still other embodiments, various components can be made from different materials, for example, a non-conductive seal, gasket, or shield can be used to provide protection against foreign materials. In yet other embodiments, various other techniques can be used to provide EMI and HIRF resistance. For example, the switch arrangement, discussed above with reference to FIG. 6, can provide a continuous ground between the input wheel and the bushings, even during switch actuation, if the input wheel, axle, axle springs, balls, and bushings are made from conductive materials. The bushings can complete the circuit to ground by being mounted in a suitable housing or being connected to a ground source.

As discussed above, FIGS. 7A and 7B also illustrates that the housing 715 surrounding the elements of the optical encoder device 710 provides a small modular unit that can be easily removed and replaced. The optical encoder device 710 includes many of the foregoing features discussed above with reference to FIGS. 3-6 including an input wheel 720; light emitters 712 and light sensors 714 mounted on circuit boards 716; the ratchet mechanism 730 having a detent wheel 731, detent arms 732, and detent springs 733; and a switch 740 all contained in a housing 715 to create a modular unit. In some embodiments, the modular unit can be configured to slide into small slots requiring little more space than the size of the input wheel 720.

A feature of foregoing embodiments, discussed above with reference to FIGS. 7A-8, is that optical encoder devices can be made resistant to contamination from foreign materials, EMI, and HIRF. An advantage of this feature is that the optical encoder devices can provide reliable performance in harsh operating environments. Accordingly, these devices can be suitable for use in vehicles that routinely operate in harsh environments and/or conditions.

Another feature is that the optical encoder devices can include a housing that creates a modular unit that is easy to install, remove, and replace. An advantage of this feature is that easy installation, removal, and replacement can keep vehicle down time and maintenance time low, reducing the overall operating cost of the vehicle. Additionally, the small size of the modular units provides designers more flexibility in positioning the optical encoder devices in vehicles (e.g., placing an optical encoder device in a control inceptor that already has numerous other control devices).

From the foregoing, it will be appreciated that specific embodiments of the invention have been described herein for purposes of illustration, but that various modifications may be made without deviating from the spirit and scope of the invention. For example, features described in the context of particular embodiments can be combined or eliminated in other embodiments. Accordingly, the invention is not limited except as by the appended claims.

We claim:

1. A vehicle optical encoder system, comprising:
   a vehicle; and an optical encoder device coupled to the vehicle, the optical encoder device including:
  an input wheel, the input wheel positioned to be actuated by an operator;
  at least one light emitter;
  at least one light sensor, the at least one light emitter and the at least one light sensor being located proximate to the input wheel to detect rotational movement of the input wheel;
  a housing configured to resist at least one of interference between an electromagnetic source and the optical encoder device and interference between a high intensity radiated field and the optical encoder device; and
  a flexible seal coupled to a portion of the housing, the flexible seal configured to resist at least one of interference between an electromagnetic source and the optical encoder device and interference between a high intensity radiated field and the optical encoder device.

2. The system of claim 1 wherein the vehicle includes a control inceptor and the optical encoder device is coupled to the control inceptor.

3. The system of claim 1, further comprising a computer to receive an output from the optical encoder device, the computer being supported by the vehicle.

4. The system of claim 1, wherein the housing supports the input wheel, the at least one light emitter, and the at least one light sensor so that the optical encoder device is coupled to the vehicle as a single modular unit.

5. The system of claim 1 wherein the seal includes a conductive material.

6. The system of claim 1 wherein the seal is configured to resist foreign material from entering the optical encoder device.

7. An optical encoder system with an optical encoder device comprising:
  an input wheel;
  at least one light emitter;
  at least one light sensor, the at least one light emitter and the at least one light sensor being located proximate to the input wheel to detect rotational movement of the input wheel;
  a housing configured to resist at least one of interference between an electromagnetic source and the optical encoder device, interference between a high intensity radiated field and the optical encoder device, and foreign material from entering the optical encoder device, the housing having an interior and an exterior, the input wheel positioned so that a portion of the input wheel extends from the interior of the housing to the exterior of the housing; and
  a flexible seal coupled to a portion of the housing, the flexible seal configured to resist at least one of interference between an electromagnetic source and the optical encoder device, and interference between a high intensity radiated field and the optical encoder device, the flexible seal being positioned to at least approximately form a seal between the housing and the input wheel where the input wheel extends from the interior of the housing to the exterior of the housing.

8. The system of claim 7, wherein the housing supports the input wheel, the at least one light emitter, and the at least one light sensor so that the optical encoder device is couplable to a structure as a single modular unit.

9. The system of claim 7, wherein the housing supports the input wheel, the at least one light emitter, and the at least one light sensor so that the optical encoder device is couplable to a portion of a vehicle as a single modular unit.

10. The system of claim 7, wherein the housing supports the input wheel, the at least one light emitter, and the at least one light sensor so that the optical encoder device is couplable to a structure as a single modular unit with at least part of the portion of the input wheel exterior of the housing positioned to be actuated by an operator.

11. An optical encoder system with an optical encoder device, comprising:
  an input wheel;
  at least one light emitter;
  at least one light sensor, the at least one light emitter and the at least one light sensor being located proximate to the input wheel to detect rotational movement of the input wheel;
  a housing configured to resist at least one of interference between an electromagnetic source and the optical encoder device and interference between a high intensity radiated field and the optical encoder device; and
  a flexible seal coupled to a portion of the housing, the flexible seal configured to resist at least one of interference between an electromagnetic source and the optical encoder device and interference between a high intensity radiated field and the optical encoder device.

12. The system of claim 11, wherein the housing supports the input wheel, the at least one light emitter, and the at least one light sensor so that the optical encoder device is couplable to a structure as a single modular unit.

13. The system of claim 11, wherein the housing supports the input wheel, the at least one light emitter, and the at least one light sensor so that the optical encoder device is couplable to a portion of a vehicle as a single modular unit.

14. The system of claim 11, wherein the optical encoder device includes at least one circuit board and wherein at least one of the at least one light emitter and the at least one light sensor is located on the circuit board.

15. The system of claim 11 wherein the input wheel includes at least one of:
  a spoke proximate to the at least one light emitter and the at least one light sensor;
  a reflective section proximate to the at least one light emitter and the at least one light sensor; and
  an optically coded section proximate to the at least one light emitter and the at least one light sensor.

16. The system of claim 11 wherein the optical encoder device includes a switch located proximate to the input wheel, the input wheel being operatively coupled to the switch so that a selected radial force on the input wheel activates the switch.

17. The system of claim 11 wherein the optical encoder device includes a switch located proximate to the input wheel, the input wheel being operatively coupled to the switch so that a selected radial movement of the input wheel activates the switch.

18. The system of claim 11 wherein the optical encoder device includes:
  a switch located proximate to the input wheel, the input wheel being operatively coupled to the switch so that at least a portion of a selected radial force on the input wheel is transferred to the switch; and
  a spring operatively coupled between the input wheel and the switch to provide resistance to the selected radial pressure.

19. The system of claim 11 wherein the optical encoder device includes a ratchet mechanism operatively coupled to the input wheel to provide the input wheel with at least one detented rotational position.

20. The system of claim 11 wherein the optical encoder device includes a ratchet mechanism operatively coupled to the input wheel to provide the input wheel with at least one detented rotational positions, the ratchet mechanism including:

a detent wheel coupled to the input wheel;

at least one detent arm to engage the detents in the detent wheel; and at least on detent spring operatively coupled to the detent arm to urge the detent arm to engage the detents in the detent wheel.

* * * * *